United States Patent [19]

Hohman

[11] 4,225,543
[45] Sep. 30, 1980

[54] METHOD FOR DETERMINING THE PELLET SIZE DISTRIBUTION OF A PELLETIZER AND FOR CONTROLLING THE OUTPUT OF SUCH PELLETIZER

[75] Inventor: Charles M. Hohman, Granville, Ohio

[73] Assignee: Owens-Corning Fiberglas Corporation, Toledo, Ohio

[21] Appl. No.: 932,244

[22] Filed: Aug. 9, 1978

[51] Int. Cl.² .............................................. B01J 2/12
[52] U.S. Cl. .................................... 264/40.4; 264/117
[58] Field of Search ............................ 264/40.4, 117

[56] References Cited

U.S. PATENT DOCUMENTS

| 3,657,400 | 4/1972 | Williams | 264/117 |
|---|---|---|---|
| 3,891,366 | 6/1975 | Rushford | 264/117 |
| 4,087,254 | 5/1978 | Takewell | 264/117 |

Primary Examiner—Donald J. Arnold
Assistant Examiner—James R. Hall
Attorney, Agent, or Firm—Ronald C. Hudgens; Patrick P. Pacella; Oliver E. Todd, Jr.

[57] ABSTRACT

Water and particulate material are placed in the pelletizer and the pelletizer rotated. The size distribution of pellets at the output of the pelletizer is controlled by altering the amount of water, or particulate material injected into the pelletizer. The output of the pelletizer is screened into two or three discrete sized groups. The groups are periodically weighed and the ratios of their weight are compared to a predetermined standard or to the ratios of the weights of a previous set of groups. The amount of water injected into the system is altered responsively to an excess weight of either the smaller or the larger sized pellets.

15 Claims, 6 Drawing Figures

METHOD FOR DETERMINING THE PELLET SIZE DISTRIBUTION OF A PELLETIZER AND FOR CONTROLLING THE OUTPUT OF SUCH PELLETIZER

FIELD OF THE INVENTION

The field of this invention is pelletizing and specifically pelletizing control.

BACKGROUND OF THE INVENTION

In a batch melting furnace, efficiency is increased when the heat from the furnace is passed in heat-exchange relationship with the batch material being supplied to the melting furnace. The batch can thus be preheated to elevated temperatures to save significant amounts of energy subsequently required to melt the batch.

Preferably, the heat-softenable batch material is in the form of balls or pellets in the heat-exchange chamber through which the hot gases are passed. However, it has been discovered that the pellet size must be substantially uniform. Otherwise, pellets of varying sizes tend to nest and provide excessive restriction to the flow of the gases past the pellets in the chamber. It has also been discovered that pellet size is important in addition to uniformity. If the pellets are too small, again undue restriction to the flow of the hot gases results. If the pellets are too large, their surface-to-weight ratio is accordingly reduced and the heat transferred to them is accordingly decreased. Also, trapped moisture in the larger pellets may turn to steam and cause the pellets to explode. Specifically, it has been found that pellets of one-half inch nominal diameter with a range from three-eights inch to five-eights inch in diameter are the ultimate for obtaining maximum heat transfer from the hot exhaust gases to the pellets.

The pellets of the heat-softenable batch material preferably are made in a modified commecially-available pelletizer. The components of the batch are mixed together and then supplied to the pelletizer. During transportation to the pelletizer, the batch components tend to segregate so that the actual batch supplied to the pelletizer will vary, even though the final pellets produced and supplied to the melting furnace or unit average out so that the short variations are not material. However, the short variations in the batch components tend to affect the pellet-forming ability of the batch and the size of the pellets produced, other factors being constant. The feed rate of the batch to the pelletizer will also vary and thereby also affect pellet forming and pellet size. Liquid, and specifically water, is also supplied to the pelletizer near the batch supply. With the batch component or quantity variation, different size pellets will result when the water quantity is held constant. However, it has been found that the water quantity, or the ratio of the batch to the water, will also affect the pellet size, with more water resulting in larger pellets and less water resulting in smaller pellets, at least in most instances.

In the prior art, considerable difficulty has been experienced with pelletizing. An acceptable manner of controlling the size of the pellets produced was experienced.

The difficulty has resulted in an uneconomical operation of a pelletizer where an excessively large portion of the pelletizer output falls above or below acceptable size limits and must be reground for recycling through the pelletizer.

SUMMARY OF THE INVENTION

This invention provides a control over the size distribution output of the pelletizer by separating the pelletizer output into a plurality of pellet size groups and then comparing the weights of the groups. A controller responsive to signals indicative of each group weight computes the ratio of the group weights. These weight ratios derived from the pelletizer output over predetermined periods of time are then compared to standard or to previous weight ratios of a set of preceding groups to determine whether the size distribution standard is being exceeded.

The standard is based on a Gaussian Distribution at the output of the pelletizer. A screening device separates the pellets into a first group corresponding to an expected group size at one end of the Gaussian Distribution and into a second group representative of an expected size at the other end of the Gaussian Distribution. The ratio of the group weights are compared to a standard based upon the expected distribution.

A controller alters the amount of water or of a particulate material being fed to the pelletizer when the weight ratio exceeds a predetemined standard or, alternatively, may alter the amount of water or of particulate material when a ratio corresponding to the weight of a first set of groups taken at a first time period shows an excessive deviation from the ratio corresponding to the weight of a second set of groups taken at a preceding period of time.

DESCRIPTION OF THE PREFERRED EMBODIMENT

The apparatus for controlling the pellet size distribution output from a pelletizer, and the operation of the apparatus, is now described with reference to the attached drawing.

Figure 1:
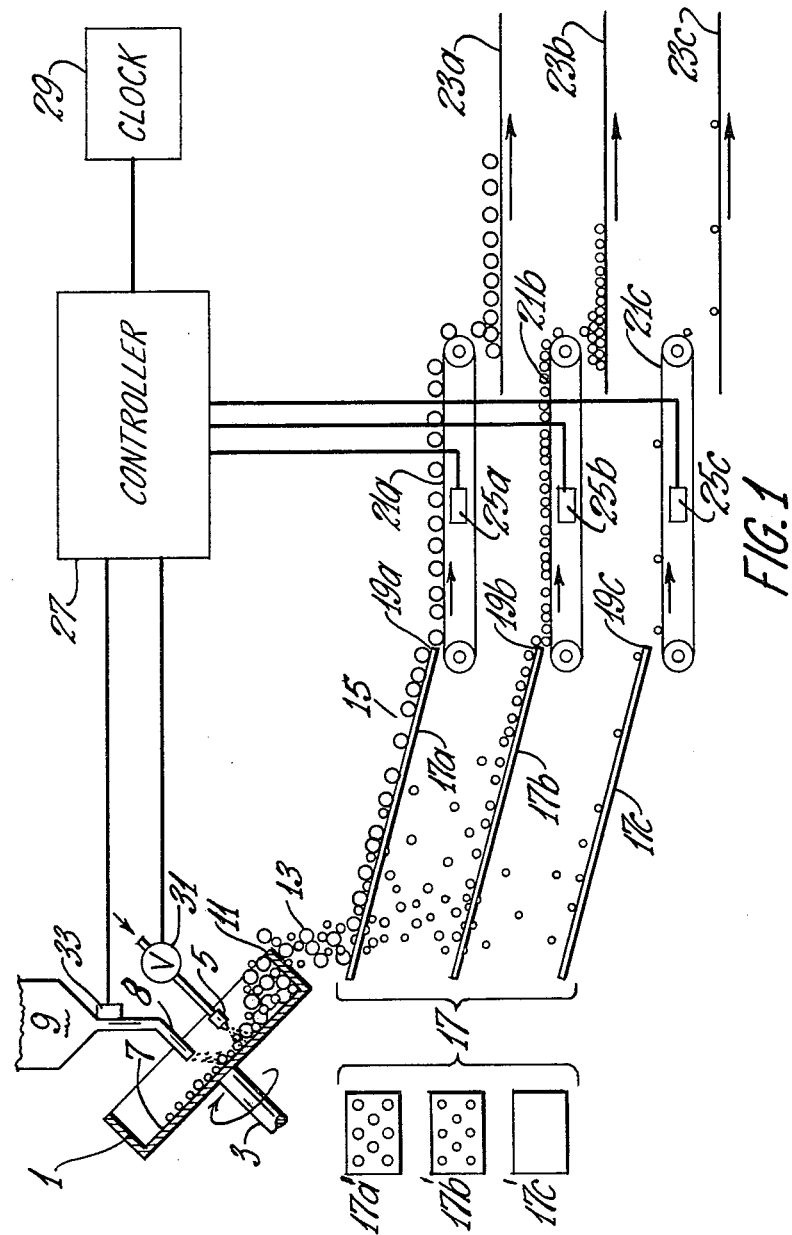
FIG. 1 shows the pelletizer of the present invention and the screening system in schematic form.

A pelletizing drum 1 is shown in cross section in FIG. 1 mounted on a shaft 3 and is rotated by said shaft as shown by the arrow. A nozzle 5 is provided to spray water onto the pelletizing drum surface 7 and a feeder 8 is provided to inject solid batch material, such as a particulate material for a glass batch, from a hopper 9 onto the drum surface 7 as is known in the prior art, and as shown in application Ser. No. 809,595 filed June 24, 1977. As used herein, "solid" means a finely divided solid or a paticulate material. The revolution of the drum 1 causes seed nuclei of pellets to build up and constantly grow until a finished size is reached. As this is a cumulative process, with additional water and particulate material being added from the nozzle 5 and the feeder 8, respectively, an overflow of pellets soon develops which cascades over the lip 11 of the pelletizer drum 1, forming an output stream 13 from the pelletizer. If the pellets are of glass batch material, they are then preheated and added to a glass melting furnace (not shown).

The invention is now specifically described with reference to the sorter mechanism identified generally as 15 and with sorter 17, having separate sorter members shown as screens 17a and 17b, and a solid tray 17c. The sorter members are shown in top partial view as 17a', 17b', and 17c', showing the relative screen sizes allowing the pellets of successively smaller diameter to pass through screens 17a or 17b to solid tray 17c which collects the smallest size pellets.

As is well known in the art, a vibrator may be connected to the sorter members 17a, 17b, and 17c, and these members may be on a suitable incline so that the output 13 of the pelletizer drum 1 falling on the screens and tray will gradually move across them, falling off at their respective edges 19a, 19b, and 19c onto conveyors 21a, 21b, and 21c, respectively.

The incline of the sorter members 17a, 17b and 17c, as well as the rate of vibrations and the rate of movement of the conveyors, may be adjusted to meet conditions of the pelletizer output 13 as is required in each individual operation, and which will be dependent upon the rate of material inflow from hopper 9, the rotational speed of the pelletizer, and the rate of water injection through the nozzle 5.

However, it should be appreciated that, with a given output 13 of the pelletizer over any one particular time duration, it can be expected that a predetermined portion of that output 13 will fall upon each of the sorter members 17a, 17b and 17c and on each of the conveyors 21a, 21b and 21c.

The conveyors 21a, 21b, and 21c are mounted adjacent suitable receiving means 23a, 23b, and 23c, respectively, which are arranged to catch the output of each of the conveyors as the conveyors transport the material. These receiving means 23a through 23c may be a trough to convey the finished pellets to selected bins, or may be other conveyor belts to convey the pellets away to the selected repositories.

The conveyors 21a, 21b, and 21c are operated at a constant speed and have sensors 25a, 25b and 25c, respectively, included within them for sensing the weight of the pellets on the respective conveyors at any given time. The weight sensors 25a, 25b, and 25c are mounted within the respective conveyors, and may be any suitable sensor mounted on or below the belt or may be an integral part of the belt, as is known in the art. A controller, shown generally as 27, has inputs connected to the weight sensors 25a, 25b, and 25c to receive the weight signals which they generate. A clock 29 is shown connected to the controller 27 to provide timing signals as is known in the art. Additionally shown is a water control valve 31, and a particulate flow control 33 to control the amounts of water and particulate injected into the pelletizer, respectively. Accordingly, controller 27 is shown as having output control lines connected to the water control valve 31 and the flow control 33.

The controller 26 may be any suitable controller, as is known in the art, for practicing this invention, and may be an analog or digital controller which controls the system according to the operation of the devices, as explained below. The clock 29 may be an integral part of the controller or a separate unit, as shown.

In the operation of the device, the pelletizer output remaining on the screen 17a is shown as a first group of oversized pellets, above an acceptable maximum size, and the pellets passing through the screens 17a and 17b and collected on the tray 17c are shown as a second group of pellets, below an acceptable size. The pelletized output remaining on the screen 17b forms a third group of those pellets falling between the minimum acceptable size which are retained by the screen 17b and the maximum acceptable size which pass through the screen 17a.

In operation of the system, the oversized pellets on screen 17a and the undersized pellets on tray 17c are only a small portion of the output of the acceptable pellets on screen 17b.

When the output is to be divided into two groups, then only one screen 17a is used and a solid tray similar to 17c is used in place of screen 17b.

Figure 2A:
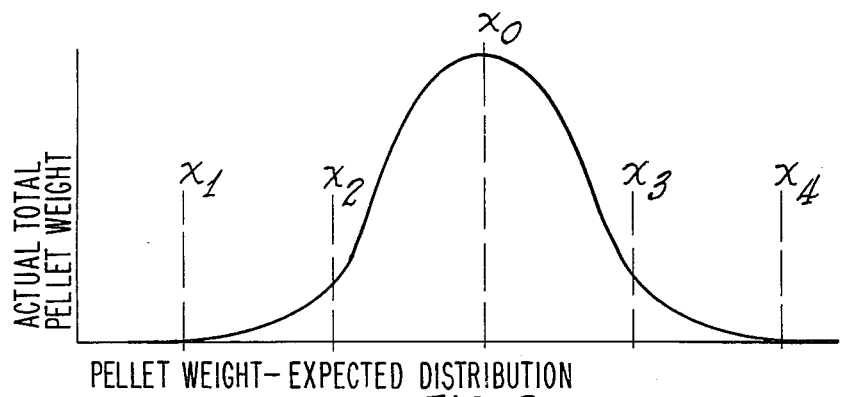
FIGS. 2a, 2b, and 2c shows a Gaussian Distribution and the manner the distribution of the pellet output from the pelletizer may shift in the event too little or too much water is added to too much or too little particulate material is added to the pelletizer.

Assuming that the output of the pelletizer is of a standard Gaussian Distribution, as shown in FIG. 2a, then the following methods may be used to control the output of the pelletizer.

Method 1: (shown in the flow chart of FIG. 3). In the case where the expected oversized and undersized pellet distribution would be substantially equal, occupying substantially the same area underneath the Gaussian Distribution curve, (areas $X_1$–$X_2$ and $X_3$–$X_4$) as shown in FIG. 2a, then the ratio of the weight of the pellets falling on conveyor 21a to the weight of the pellets falling on conveyor 21c over any time period is a predetermined weight standard based on the weight of the respective oversize and undersize size distributions.

Accordingly, the weight signals provided by weight sensors 25a and 25c, transmitted to the controller 27, are evaluated by taking the ratio of these sensed weights over any one particular period $t_n$ as timed by clock 29, and comparing that to an acceptable standard. The comparison of the conveyor weights may be expressed as $$\frac{1}{2} < \frac{W_{25a}}{W_{25c}} < 2 \quad \begin{array}{c} t_n \\ t = t_o \end{array}$$

Where $W_{25a}$ is the weight on the sensor 25a at time $t_n$ and $W_{25c}$ is the weight on the sensor 25c at time $t_n$ and the weight ratio $W_{25a}/W_{25c}$ is taken at discrete time intervals from $t=t_o$ to $t=t_n$.

When the predetermined weight ratio either exceeds the standard or is under the standard, then the amount of water or of particular material feed is controlled accordingly. For example, either increasing the flow of water while maintaining the flow of particulate material or decreasing the flow of particulate material while maintaining the flow of water will increase the average pellet size. Or, an opposite change will decrease the average pellet size.

Figure 3:
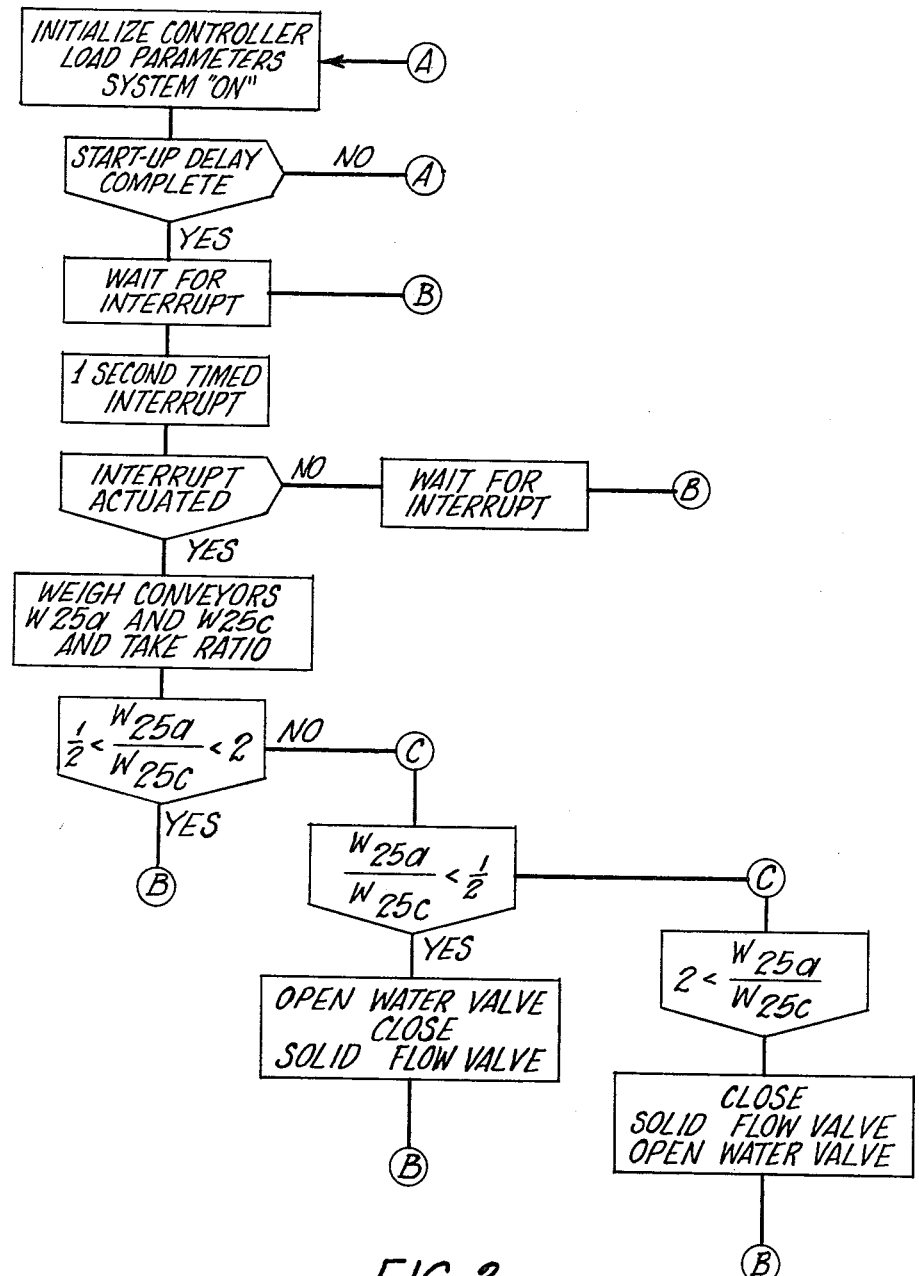
FIG. 3 is a flow chart of the process of method 1 where the screened weight ratios taken at discrete time periods are compared to a predetermined standard.

Thus, where the maximum acceptable predetermined weight standard is in the ratio of 2/1, and the minimum acceptable weight standard is in the ratio of 1/2, the controller 27, after proceeding through the initialization steps as shown in FIG. 3, then proceeds through the method of comparison taking the ratio and comparing it to the predetermined weight standard. It then alters the amount of water, diminishing the amount of water if the ratio of 2/1 is exceeded or increases the water input if the ratio falls below 1/2. The amount of particulate material fed into the pelletizer 1 also can be diminished or increased where the ratio goes above 2/1 or goes under 1/2, respectively.

These ratios are not meant to be absolutely required for this process to work, but are provided to be merely exemplary of the process. The exact ratios are dependent upon the amount of solid material, as well as the quality of solid material, fed into the pelletizer, the speed of the pelletizer, its rate of output 13, and the boundaries selected under a Gaussian Distribution or any other distribution for acceptable-sized and rejected pellets.

Method 2: (shown in the flow chart of FIG. 4) A second method of controlling the pellet size distribution operates substantially as in Method 1. However, controller 27 is programmed to take the weight difference between the weight sensors 25a, 25b, and 25c (or 25a and 25b if the pelletizer output is separated into only two groups) at selected times. These weights are compared, and used to control the amount of water or particulate material fed to the pelletizer.

For example, where the object is to maintain a margin of acceptable pellets under the Gaussian Distribution of FIG. 2a in a continuous fashion, the controller may store the ratio taken between the weights of any two of the three conveyors, and compare that ratio to the next subsequent ratio taken, or to the immediately precedent ratio, as regulated by the clock 29. These two ratios—the one immediately taken and the preceding ratio—are compared by either subtracting one from the other, or by taking a ratio therebetween. The new comparison shows an increasing trend or a decreasing trend and shows the weight ratio increasing or decreasing. For example, at time $t_{n-1}$ the ratio of the weights on the sensors 25a and 25c might be approximately 1.25/1. At time $t_n$ when the ratio is again taken, the ratio might have increased to 1.3/1. The controller 27, sensing this increase in ratio, reacts continuously and proportionally in response to the change in the ratio. In this case, the change in the ratio is in a direction of a larger distribution of oversized pellets, and the controller reduces the amount of water or increase the amount of solid material delivered to the pelletizer proportionately. In this way, the process can maintain continuous control over the pelletizer by comparing the ratios of weights taken at two separate time periods.

Figure 4:
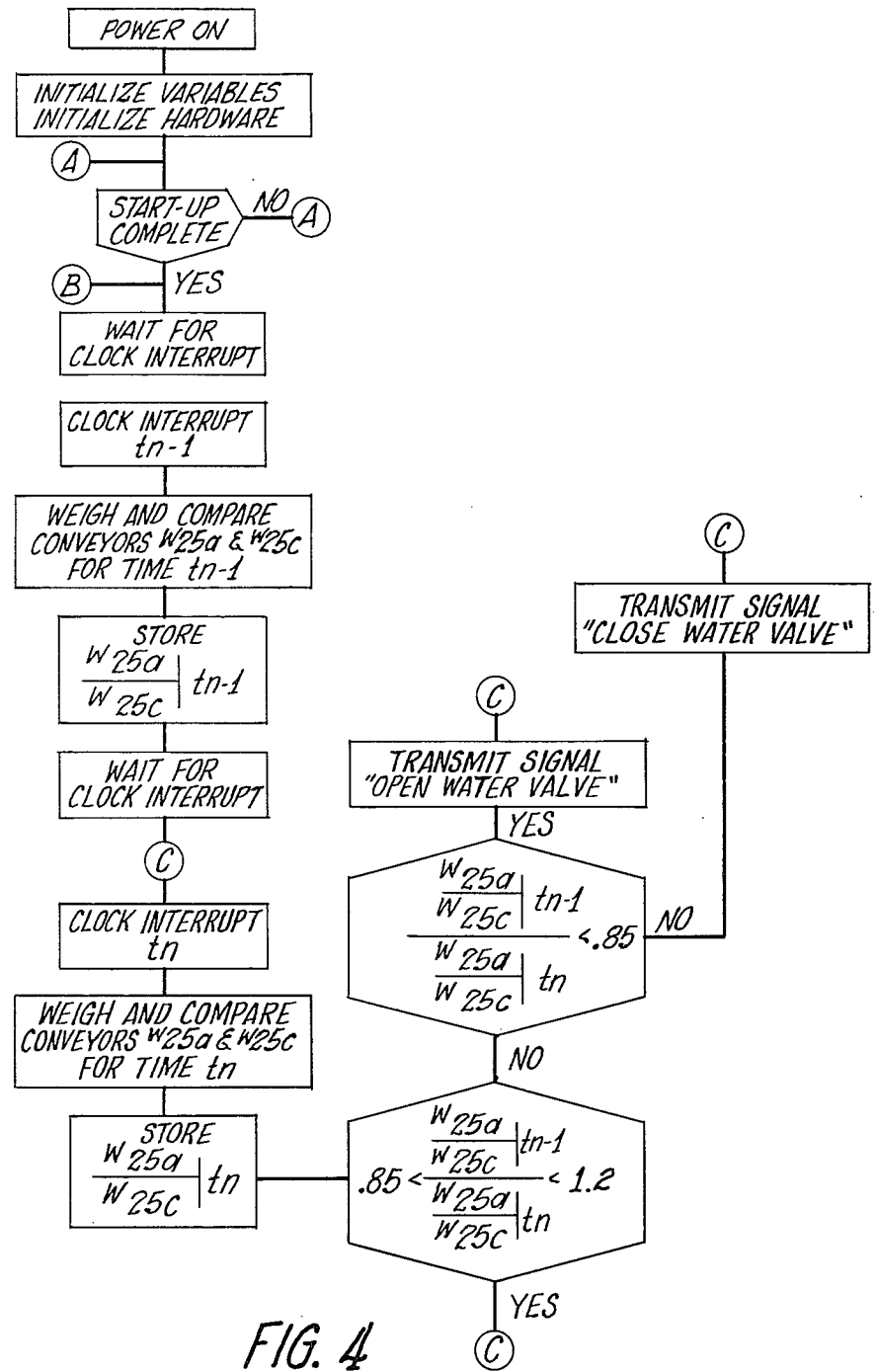
FIG. 4 is a flow chart of method 2 where the ratio of the weights at discrete time intervals are compared to the ratio taken at a preceding interval.

The method of comparison of FIG. 4 can be expressed as $$0.85 < \frac{\frac{W_{25a}}{W_{25c}} \text{ (at } t_{n-1})}{\frac{W_{25a}}{W_{25c}} \text{ (at } t_n)} < 1.2$$

where the exemplary upper limit is 1.2 and the exemplary lower limit is 0.85.

Additionally, in Method 2 the controller can be programmed so that the amount of water or particulate material fed into the pelletizer is not altered until the ratio exceeds or goes under established limits, as in the previous case.

FIG. 2a shows the Gaussian Distribution of the pelletized output, with the area between $X_1-X_2$ representing the distribution of undersized pellets, the area between $X_3-X_4$ representing the distribution of oversized pellets, and the area between $X_2-X_3$ representing the distribution of pellets within the acceptable limits as established for each individual case.

Figure 2B:
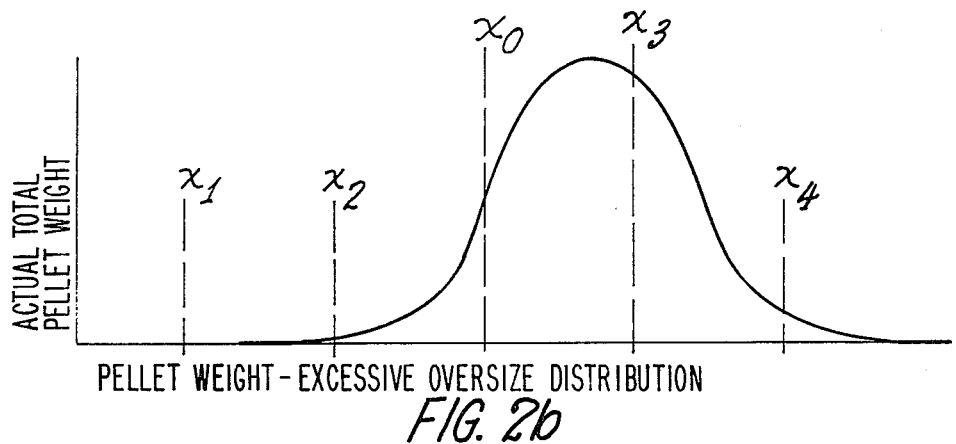
Figure 2C:
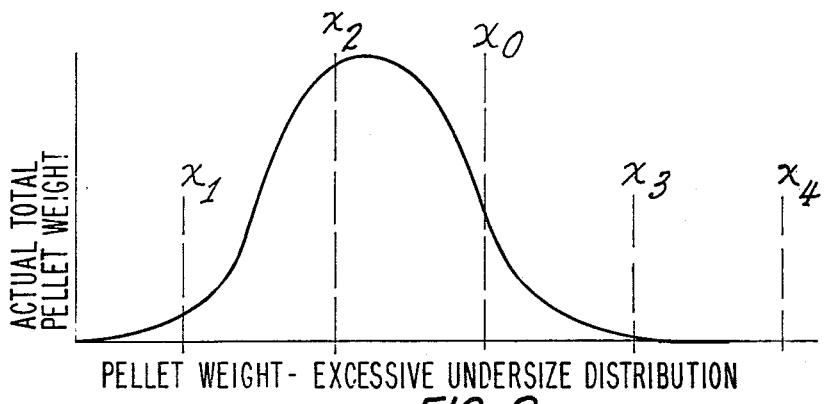

FIG. 2b shows the Gaussian Distribution of FIG. 2a, but where an excessive amount of water is being added to the pelletizer and with Gaussian Distribution displaced to the right to produce an oversupply of oversized pellets (the area between $X_3-X_4$). This represents a condition where the upper ratio is exceeded and the amount of water to the pelletizer must be reduced or the amount of solid material increased. FIG. 2c represents a second abnormal condition, where the Gaussian Distribution has moved to the left, producing an oversupply of undersized pellets caused by insufficient water to the pelletizer, and requiring an increase in the water supply or a decrease in particular material supply accordingly.

Further, using a single weight limit and dividing the output into two weight groups $W_{25a}$ and $W_{25b}$, assuming only one screen 17a and a tray 17c, a comparison ratio of 1/1 could be the predetermined desired standard where the size of screen 17a was chosen to divide the output into two equal groups above ½ inch and below ½ inch in diameter. The comparison is expressed as Method 1
$$0.85 < \frac{W_{25a}}{W_{25c}} < 1.2 \quad \begin{array}{l} t_n \\ t = t_o \end{array}$$

over the discrete time intervals $t_o$ to $t_n$ with upper limit 1.2 and lower limit 0.85.

Alternatively, the weight ratio taken at any time $t_n$ may be compared to the weight ratio taken at time $t_{n-1}$. The comparison over separate time intervals may be expressed as Method 2
$$0.85 < \frac{\frac{W_{25a}}{W_{25c}}}{\frac{W_{25a}}{W_{25c}}} < 1.2 \quad \begin{array}{l} t_n \\ t = t_o \end{array}$$

where the system is operating within upper limit 1.2 and lower limit 0.85.

Where the second screen 17b is used and the output is divided into three weight groups $W_{25a}$, $W_{25b}$, and $W_{25c}$ as shown in FIG. 1, a coarser tolerance may be tolerated as the weight of the selected and weighed groups would be considerably smaller than the total output. The reason is these groups $X_1-X_2$ and $X_3-X_4$ under the curve of FIG. 2 represent the rejected pellets. In this case the comparison limits can be broader since the change in the absolute amount of rejected pellets as the distribution shifts right or left is less because the area under the Gaussian Distribution curve is less in these areas.

The control signals produced on line may have a continuously varying magnitude to continuously modulate the valves proportionally to the ratio or the signal may have a discrete level to either open the valve wider by a discrete amount, to maintain the valve in its steady state position or to close the valve by a discrete amount. Alternately, the particulate material flow control may be operated in the opposite direction.

The method of comparing successive weight ratios at times $t_n$ and $t_{n-1}$ may be used alone or in cooperation with the method of comparing weight ratios taken at the same time interval.

Where the two methods are used cooperatively, the comparison may be alternated with the controller shifted from one method to the other at each successive interval and the same method following at every other interval.

As example, method 2 would be used at intervals $t_{n-3}, t_{n-1}, t_{n+1}, t_{n+3}$ and method 1 would be used at intervals ... $t_{n-2}, t_n, t_{n+2}$ ...

The signals produced by either method 1 or method 2 may be proportional control signals or may be discrete level signals to open or close the valves in preset steps as stated.

The limits for the ratios chosen are merely to serve as examples. The specific limits chosen would depend upon the size and speed of the pelletizer and the type of material used.

It is to be understood that the pelletizer output is not necessarily a Gaussian Distribution. The output of the pelletizer may be skewed dependent on the size or speed of the pelletizer, and the type of batch material used.

The Gaussian Distribution of FIGS. 2a, 2b and 2c is merely shown as an example, it being understood that actual practice will not typically produce the Gaussian Distribution shown. Where the distribution is empirically determined, the upper and lower limits are adjusted according to the size distribution desired.

I claim:

1. A method for controlling the size distribution of pellets produced by a pelletizer comprising the steps of:
   (a) adding particulate material to a pelletizer;
   (b) adding liquid to the pelletizer;
   (c) operating said pelletizer to produce pellets;
   (d) separating such produced pellets into at least two groups of separate and distinct pellet sizes;
   (e) weighing the separated groups;
   (f) comparing a ratio of the weights of said groups to a predetermined standard to determine the pellet size distribution produced by said pelletizer; and
   (g) controlling the adding of at least one of the particulate material and the liquid to said pelletizer in response to said compared weights to obtain a predetermined pellet size distribution from said pelletizer.

2. The method of claim 1 wherein such produced pellets are separated into first and second groups with the pellets of the first group smaller than the pellets of the second group.

3. The method of claim 2 wherein the step (f) of comparing includes the step of comparing the ratio of the weights of said first and second groups to the ratio of the weights of a preceding first and second groups to determine any time change in the pellet size distribution produced.

4. The method of claim 2 wherein:
   the step (d) of separating includes separating such produced pellets into at least three groups including a first group of unacceptable pellets below a lowest acceptable size limit, a second group of acceptable pellets greater than the lowest size limit and less than a highest acceptable size limit and a third group of unacceptable pellets above the highest acceptable size limit; and
   wherein the step (f) of comparing includes comparing the weight of at least two of said three groups to a predetermined standard to determine the pellet size distribution produced.

5. The method of claim 4 wherein the step (f) of comparing includes the step of comparing a first set of said groups weighed at a discrete time to a second set of said groups weighed at a separate discrete time.

6. The method of claim 2 wherein:
   the step (d) of separating the pellets into groups includes the step of separating said pellets into at least three groups including a first unacceptable group having pellets below a lower acceptable pellet size, a second acceptable group having pellets below an upper acceptable pellet size and above the lower acceptable size and a third unacceptable group having pellets above the upper acceptable pellet size; and
   wherein the step (f) of comparing includes a step of weighing each of said groups and comparing said weights to the weights of three corresponding preceding groups to determine any changes in the distribution of produced pellets.

7. The method of claim 2 wherein the step (g) of controlling comprises controlling the amount of liquid added to the pelletizer in response to said comparison to control the size distribution of said pelletizer.

8. A method of controlling the size of pellets produced by a pelletizer comprising the steps of:
   (a) adding particulate material to a pelletizer;
   (b) adding liquid to the pelletizer and simultaneously operating said pelletizer to produce pellets;
   (c) separating the produced pellets into a plurality of pellet size groups by screening said produced pellets and directing all pellets smaller than a lower size limit into a first group and all pellets larger than an upper size limit into a second group;
   (d) weighing each of said groups;
   (e) comparing the ratios of the weights of said groups to a predetermined standard to determine the pellet size distribution produced by the pelletizer; and
   (f) controlling the adding of at least one of the particulate material and the liquid to said pelletizer in response to said comparison of said weight ratios to said standard to obtain a predetermined pellet size distribution from said pelletizer.

9. The method of claim 8 wherein said step (e) of comparing includes the step of continuously weighing samples of each group taken at periodic time intervals and comparing the weight ratio of the first and second groups of a first set of groups taken at a first time with the weight ratio of first and second groups of a second set of groups taken at a second separate time.

10. The method of claim 9 wherein said step (f) of controlling is in response to an increase of the weight of the second group and a simultaneous decrease of the weight in the first group and is in response to an increase in the weight of the first size group and a simultaneous decrease in the weight of the second size group.

11. The method of claim 8 wherein said step (c) of separating includes the further step of screening the pellets into a third group comprising pellets of a size falling between the lower size limit and the upper size limit.

12. The method of claim 11 wherein said step (f) of controlling the amount of at least one of the liquid and the particulate material added to the pelletizer includes the step of controlling proportionally to said comparison of said first and second groups.

13. The method of claim 11 wherein said step (f) of controlling the amount of at least one of the liquid and the particulate material added to the pelletizer is responsive to the comparison of the weights of said first and second groups to a predetermined standard.

14. The method of claim 11 wherein said step (e) of comparing includes the step of continuously weighing samples of each group taken at periodic time intervals and comparing the weight ratio of the first and second groups of a first set of groups taken at a first time with the weight ratio of first and second groups of a second set of groups taken at a second separate time.

15. The method of claim 14 wherein said step (f) of controlling is in response to an increase of the weight of the second group and a simultaneous decrease of the weight in the first group and is in response to an increase in the weight of the first size group and a simultaneous decrease in the weight of the second size group.

* * * * *